June 2, 1953  F. C. FISHER  2,640,955
ELECTROMAGNETIC STRAIGHT-LINE MOTOR
Filed April 2, 1949  4 Sheets-Sheet 1
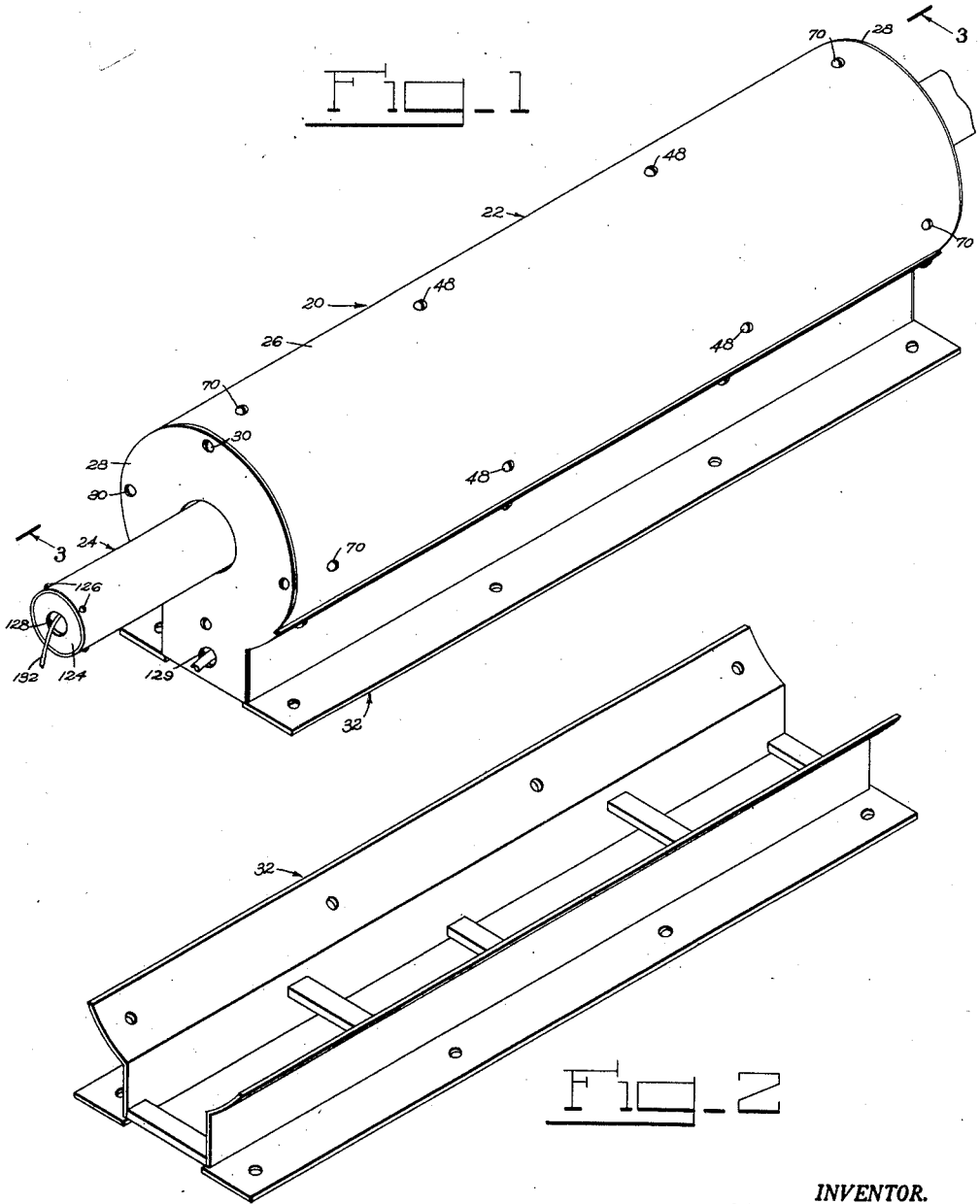
INVENTOR.
FREDERICK C. FISHER
BY Edwin Levisohn
Harry Cohn
ATTORNEYS June 2, 1953  F. C. FISHER  2,640,955
ELECTROMAGNETIC STRAIGHT-LINE MOTOR
Filed April 2, 1949  4 Sheets-Sheet 2
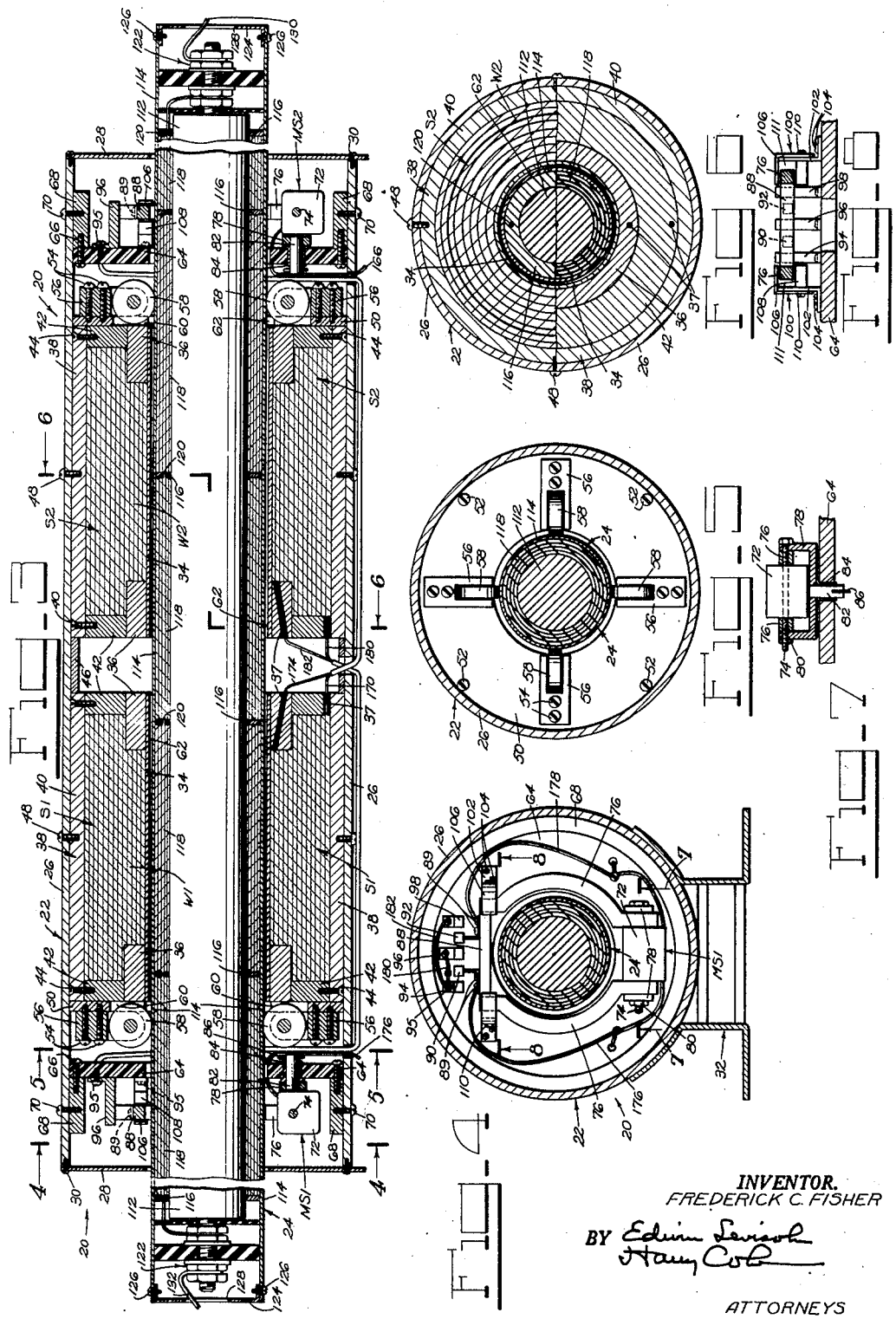
INVENTOR.
FREDERICK C. FISHER
BY Edwin Levisohn
Harry Cole
ATTORNEYS June 2, 1953     F. C. FISHER     2,640,955
ELECTROMAGNETIC STRAIGHT-LINE MOTOR
Filed April 2, 1949     4 Sheets-Sheet 3
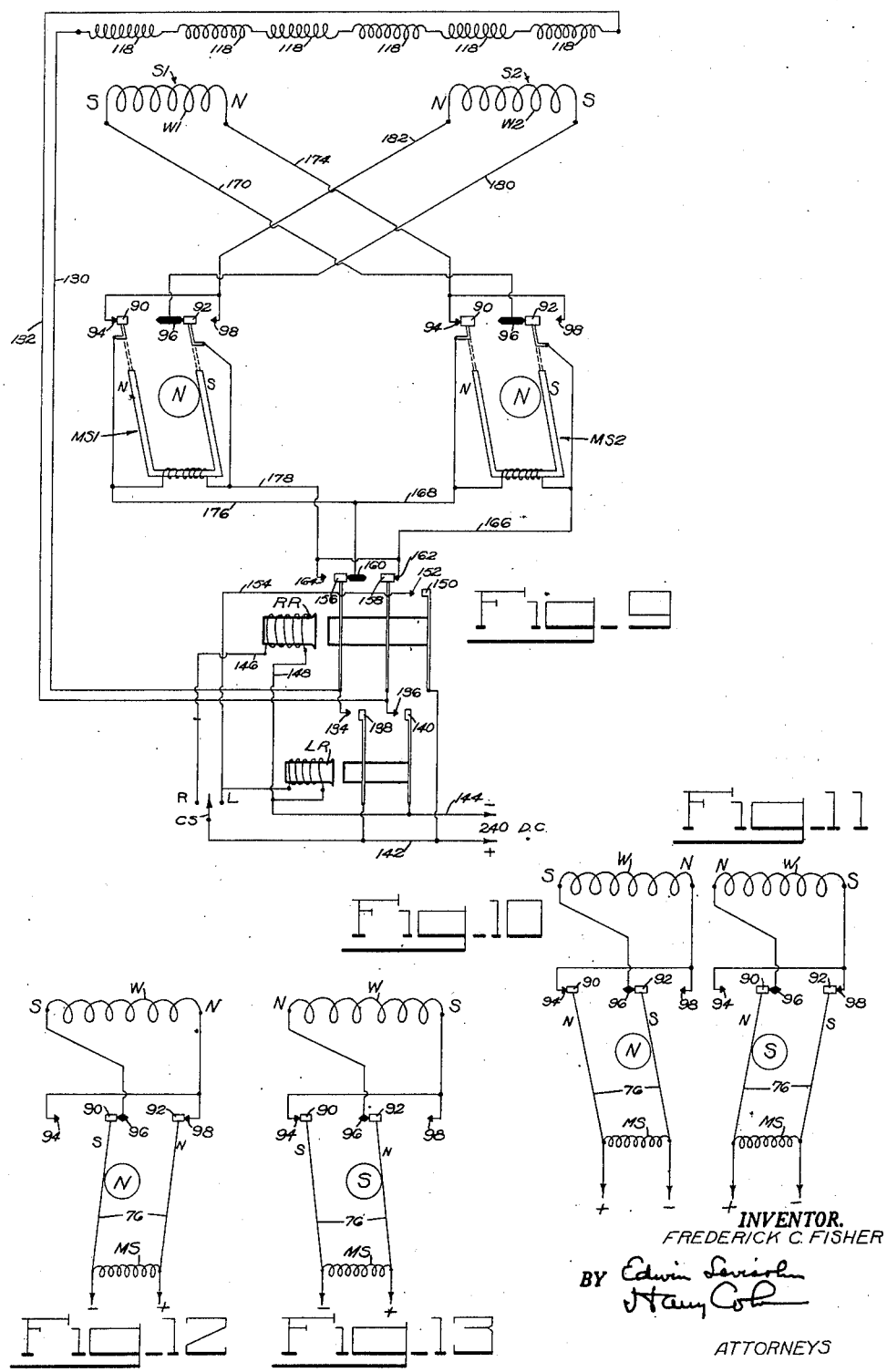
INVENTOR.
FREDERICK C. FISHER
BY Edwin Lavierh
    Harry Cohn
ATTORNEYS Patented June 2, 1953

2,640,955

UNITED STATES PATENT OFFICE 2,640,955

ELECTROMAGNETIC STRAIGHT-LINE MOTOR

Frederick C. Fisher, Bellmore, N. Y., assignor to Electronoid Corporation, New York, N. Y., a corporation Application April 2, 1949, Serial No. 85,067

25 Claims. (Cl. 318—135)

This invention relates to an improved electromagnetic straight-line motor which, while useful for other purposes, is intended primarily for operating the doors of elevators, or the like.

The electromagnetic straight-line motor of the present invention is of the general type described in my prior Patent No. 2,365,632, dated December 19, 1944, which comprises two relatively movable units, one of which is a power unit provided with a series of tandem-arranged solenoid windings, and the other is an articulated solenoid plunger extending through these windings. The solenoid windings are energized in proper sequence by means controlled by the relative movement between the units and operate in such a manner as to dispense with individual switch-operating mechanisms for the several solenoid windings. More particularly, the solenoid windings are connected to, and disconnected from, a source of alternating current under the control of relays which are, in turn, controlled by current-varying choke coils, whereby to produce a relative movement between the units which is smooth and continuous through a range required for actuating the device operated thereby. In my copending application, Serial Number 742,622, filed April 19, 1947, now Pat. No. 2,483,895, there is described a straight-line motor in which the solenoids are adapted for operation with direct current, and, in which alternating current is used to energize the choke coils. The control relays operate on direct current and rectifying means are used to rectify the alternating current supplied by the choke coils to the control relays.

One object of the present invention is to provide a straight-line motor which is well adapted to be operated and controlled by direct current.

Another object is to produce a straight-line motor in which the controls are reduced to a minimum by the elimination of all control relays, except for a line relay and a reversing relay.

A further object is to produce a straight-line motor having a plunger of simplified construction and an improved magnetic switch responsive to said plunger.

The above and other objects, features and advantages of the present invention will be more fully understood from the following description considered in connection with the accompanying illustrative drawings.

In the drawings:

Fig. 1 is a perspective view of an electromagnetic straight-line motor embodying the present invention;

Fig. 2 is a perspective view of a support for the motor;

Fig. 3 is a sectional view taken on line 3—3 of Fig. 1, the support being omitted and some parts being shown in elevation;

Fig. 4 is a sectional view taken on line 4—4 of Fig. 3, and including the support;

Fig. 5 is a sectional view taken on line 5—5 of Fig. 3;

Fig. 6 is a sectional view taken on line 6—6 of Fig. 3;

Fig. 7 is a sectional view taken on line 7—7 of Fig. 4;

Fig. 8 is a sectional view taken on line 8—8 of Fig. 4;

Fig. 9 is a wiring diagram of the motor;

Figure 14:
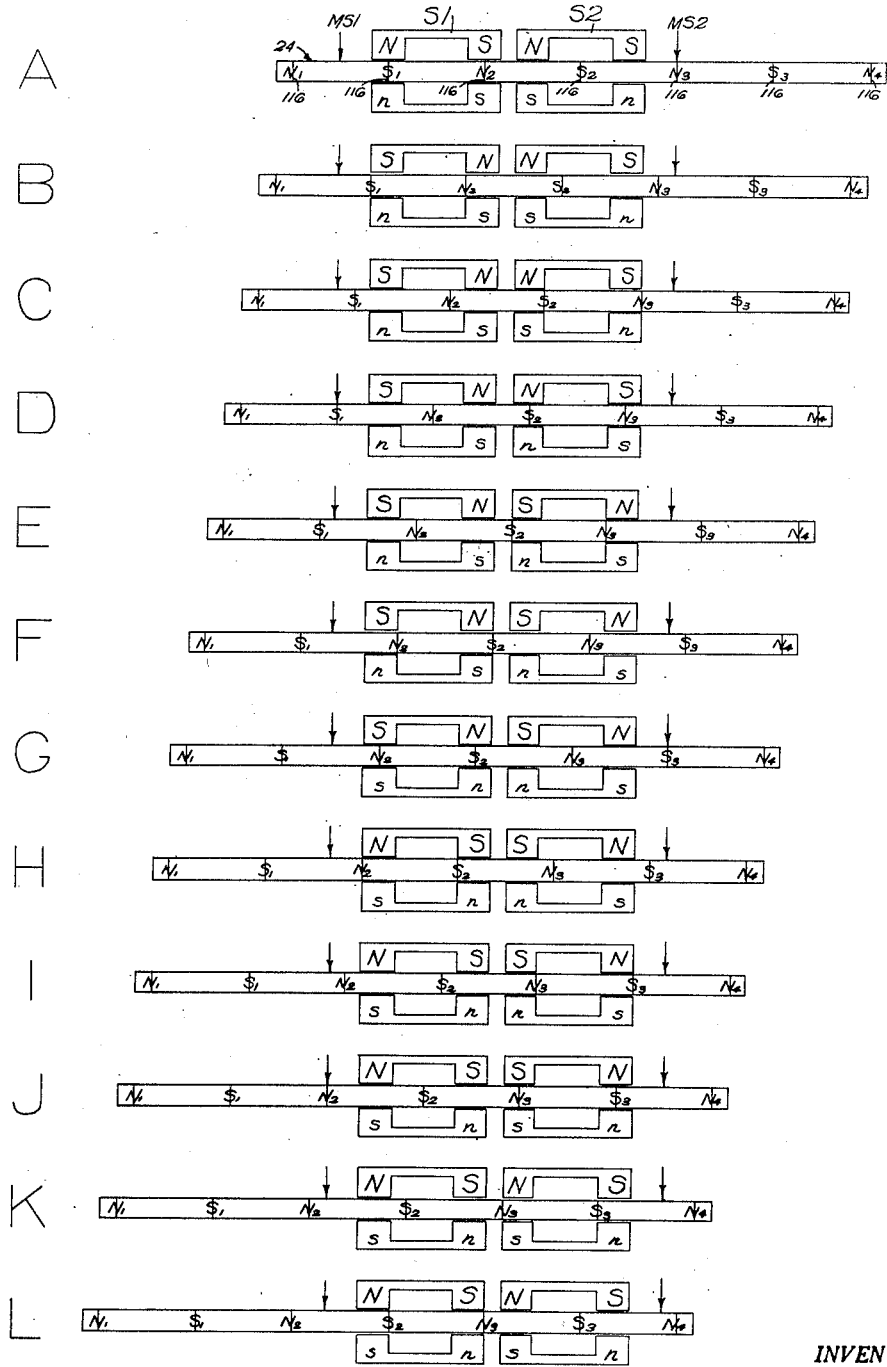

Figs. 10 to 13 diagrammatically illustrate the various positions of the solenoid polarity reversing switches; and Fig. 14 diagrammatically illustrates different operating positions of the solenoid plunger of the motor relative to the solenoid windings.

Referring to the drawings, particularly to Figs. 1 through 8, the electromagnetic straight-line motor 20 comprises a power unit 22 and a cylindrical electromagnetic solenoid plunger 24, said unit and plunger being relatively movable. The power unit 22 comprises a cylindrical shell or casing 26 of sheet metal, or other suitable material which houses the solenoids S1 and S2. The open ends of the casing 26 are normally closed by the centrally-apertured cover plates or members 28 which are secured to the casing by screws 30, or other suitable means. The casing 26 is carried by a base or mounting 32, which facilitates the mounting of the power unit 22. Each of the solenoids S1 and S2 comprises a tubular member 34, preferably formed of brass or other non-magnetic material, two spaced cylindrical end members 36 preferably formed of steel, or other magnetic material, which have a pressed fit on the tubular member, and a shell 38 formed of steel, or other magnetic material, constituted by the cylindrical member 40 secured to casing 26 by screws 48 and the centrally-apertured discs 42, the latter being secured to the ends of member 40 by the countersunk screws 44 and abutting end members 36, as shown in Figs. 3 and 6. The tubular member 34 and the end members 36, of each solenoid, form a bobbin for the reception of the solenoid winding W which is fitted into the shell 38, apertures 37 being provided in member 36 and disc 42 for the entry of the winding leads. Solenoids S1 and S2, are disposed in end-to-end relation in casing 26 and are separated by the annular member or spacing ring 46, against which both solenoids abut, the ring 46 being dimensioned to so space the solenoids within the casing that the distance between the centers of the pole faces or members 36 of each solenoid is equal to the distance from the center of each solenoid to the center of the adjacent pole face or member 36 of the companion solenoid. A centrally apertured disc 50 abuts the outer end of each solenoid S1, S2, and is secured to cylindrical member 40 by screws 52. Mounted on each disc 50, by screws 54, are the quadrangularly arranged brackets 56 in which are journaled rollers 58 that serve as anti-friction bearings for the cylindrical solenoid plunger 24, said rollers extending into a cut-out portion 60 in the disc. Plunger 24, which extends through the tubular members 34 of solenoids S1 and S2, is of slightly smaller diameter than the internal diameter of these tubular members, and the bearing rollers 58 position the plunger 24 so that the same is spaced from the tubular members by a uniform cylindrical gap 62. Spaced outwardly from each set of the quadrangularly mounted rollers 58 is a centrally apertured disc 64, preferably formed of Bakelite or other suitable electrical insulating material, which is secured by screws 66 to an annular member 68 secured to casing 26 by screws 70. It will be understood that member 68 can be integral with disc 64. A magnetic switch MS1 is mounted on the disc 64 adjacent solenoid S1 and a similar magnetic switch MS2 is mounted on the disc 64 adjacent solenoid S2. Each magnetic switch comprises a suitable housing 72 containing a coil wound on an iron core preferably constituted by the bolt 74. A pole piece 76 is mounted on each end of the bolt, said pole pieces extending upwardly from both sides of the housing, as shown in Fig. 4, and being mutually bowed to allow the passage of the plunger 24 between each companion pair of pole pieces. Bolt 74 is threaded through the upstanding arms of a U-shaped yoke 78 (Fig. 7), of non-magnetic material, and is secured therein by a nut 80, the housing 72, with pole pieces 76 abutting each end thereof, being positioned between said arms. A shaft or pivot 82 is secured to the bottom of yoke 78 and is mounted for rotation in a bushing 84 positioned in disc 64, the shaft being retained in position by a cotter-pin 86 disposed below the bushing (Figs. 3 and 7). The free ends of pole pieces 76 are joined by an insulated strip 88 on which screws 89 mount the movable switch contacts 90 and 92 (Fig. 4), the associated stationary contacts 94, 96 and 98 (Figs. 4 and 8) being mounted on disc 64 by screws 95. As is explained in greater detail below, due to the magnetic reaction between plunger 24 and the pole pieces 76, the latter are either attracted to, or repelled by, the plunger, resulting in the rotation of yoke 78, on shaft 82, relative to disc 64. During this rotation of yoke 78 in both directions, responsive to changes in the magnetic reaction between plunger 24 and the pole pieces 76, the movable contacts 90 and 92, carried by the pole pieces, make contact in one direction with fixed contacts 94 and 96, and in the opposite direction, with fixed contacts 96 and 98, the fixed contacts serving as stops to limit the pendulum-like motion of the pole pieces in both directions. Guides 100 are mounted on disc 64 and serve to prevent the rotation of pole pieces 76 about bolt 74, said rotation being perpendicular to the desired rotation on shaft 82. Each guide 100 comprises an iron angle 102 secured to disc 64 by screws 104, an angle 106 and a block 108, both of the latter being preferably formed of brass or other non-magnetic material, and both being mounted on angle 102 by a screw 110, as shown in Fig. 8, to provide a guideway 111 between said block and said angle 106 for the movement of the pole pieces therebetween, the block and the upper part of angle 106 limiting the undesired movement of the pole pieces.

Plunger 24, which is disposed interiorly of power unit 22 and is mounted on rollers 58 for movement longitudinally of the power unit, comprises a cylindrical core 112 preferably formed of steel bar stock, or other magnetic material, a cylindrical housing 114 preferably formed of stainless steel tubing or other non-magnetic material, and the centrally-apertured spaced ribs or washers 116, preferably formed of steel or other magnetic material, coaxially mounted on the core and supporting the housing. The ribs 116 are so spaced on the core that the distance between the centers of adjoining ribs is the same as the distance between the centers of the pole faces or members 36 of each solenoid S1, S2. A coil 118 is wound about core 112 between each pair of adjoining ribs, all of said coils 118 being connected in series, and each coil 118 being wound in a direction opposite from that of the adjoining coil whereby upon application of a direct current to the coils, alternate north and south poles will exist longitudinally of plunger 24. Each rib 116 is apertured as at 120 (Figs. 3 and 6) for the passage of the winding leads between adjacent coils, and a lead from each outer coil 118 is connected to a terminal member 122 for connection to the direct current supply. Plunger 24 is provided at each end with a plate 124 secured to the housing 114 by screws 126. Each plate 124 is provided with an opening 128 through which a lead from the direct current source is connected to the terminal member 122. A similar opening 129 (Fig. 1) is provided in the end plate 28 of housing 26 for the leads from solenoids S1 and S2 and from switches MS1 and MS2.

If the present motor is applied to the operation of an elevator door, for example, the power unit 22 may, as in the case of my prior motors, be carried by the elevator door so as to be movable with the same, while the solenoid plunger 24 may be fixedly mounted on the elevator in such relation to the door thereof that the power unit may ride on the plunger when the door is opened or closed. It is, of course, understood that the present motor may be applied for operating any device other than an elevator door, and that the power unit may be held stationary and the plunger permitted to move and operate a device.

Reference is now had to the wiring diagram in Fig. 9 which shows the operating and control circuits for the motor. The serially connected plunger coils 118, each of which is wound in opposition to the adjoining coil, are connected through leads 130 and 132 to the stationary contacts 134 and 136 of the line relay LR which is provided with the companion movable contacts 138 and 140 connected to leads 142 and 144, respectively, which leads are connected to a direct current supply indicated at DC. When the pole of single-pole double-throw control switch CS makes contact with the stationary contact L, indicating left thrust of the plunger 24, the line relay LR is connected to the D. C. source through leads 142 and 144, and the normally open movable contacts 138 and 140 close to make contact with the companion stationary contacts 134 and 136, respectively, thereby connecting the coils 118 to the D. C. supply and establishing alternate north and south poles along the serially connected coils. When the control switch CS is moved to position R, indicating right thrust of the plunger 24, the reversing relay RR is connected to the D. C. source through leads 146—142, and 148—144 and, upon the energization of relay RR, its normally open movable contact 150, which is connected to lead 142, makes contact with the companion stationary contact 152 which in turn, is connected to lead 154 which connects to line relay LR, the latter being at all times connected to one terminal of the D. C. source through lead 144, thereby energizing the line relay whereupon the coils 118 are connected to the D. C. source in the same manner as stated above for position L. The reversing relay RR is also provided with the movable contacts 156 and 158 which make contact with the companion stationary contacts 160 and 162, respectively, in the unenergized condition of the relay, and which make contact with the companion stationary contacts 164 and 160, respectively, upon the energization of the relay. The movable contacts 156 and 158 of relay RR are connected to the stationary contacts 134 and 136, respectively, of relay LR, whereby, upon moving the control switch CS to position L, the stationary contact 160 of relay RR is connected to the D. C. supply through the normally closed contact 156, contacts 134 and 138 of relay LR and lead 142; and stationary contact 162 of relay RR is connected to the D. C. supply through the normally closed contact 158, contacts 136 and 140 of relay LR and lead 144. The coil of switch MS2 is connected through leads 166 and 168 to contacts 162 and 160, respectively, of relay RR whereby it is connected to the D. C. source, as set forth above. The movable contacts 90 and 92 of switch MS2 are also connected to leads 168 and 166, respectively, and thereby to the D. C. source. The winding W1 of solenoid S1 is connected to fixed contact 96 of switch MS2 through lead 170 and to both fixed contacts 94 and 98 of switch MS2 through lead 174. It will be understood that the magnetic switch MS2 on the right-hand side of Fig. 3 controls the polarity of solenoid S1 on the left-hand side of Fig. 3. The coil of switch MS1 is connected through lead 178 to both stationary contacts 164 and 162 of relay RR and through lead 176 to the stationary contact 160 whereby it is connected to the D. C. source through the contacts of the line relay LR, as stated above. The movable contacts 90 and 92 of switch MS1 are also connected to leads 176 and 178, respectively, and thereby to the D. C. source. The winding W2 of solenoid S2 is connected to the fixed contact 96 of switch MS1 through lead 180 and to both fixed contacts 94 and 98 of switch MS1 through lead 182. It will be understood that magnetic switch MS1 on the left-hand side of Fig. 3 controls the polarity of solenoid S2 on the right-hand side of Fig. 3. It will be apparent that with switch CS in position L, leads 166 and 178 are connected to the negative terminal of the D. C. supply through fixed contact 162 and movable contact 158 of relay RR, and that leads 168 and 176 are connected to the positive terminal of said supply through fixed contact 160 and movable contact 156. With switch CS in position R, relay RR is energized so that contacts 156 and 158 are moved to contacts 164 and 160, respectively, thereby connecting leads 166 and 178 to the positive terminal and leads 168 and 176 to the negative terminal of the D. C. supply.

The motor of the present invention is similar in operation to a direct current motor, the solenoids S1, S2 being the fields, the plunger 24 being the armature and the magnetic switches MS1, MS2 acting as a commutator. Since the distance between the centers of the pole faces of each solenoid is equal to the distance from the center of each solenoid to the center of the adjacent pole face of the companion solenoid, and since each plunger coil 118 is positioned between a pair of ribs 116, the distance between the centers of adjoining ribs being the same as the distance between the centers of the pole faces of each of the solenoids, it will be apparent that when a pair of plunger poles are exactly in line with a pair of solenoid poles, the next plunger pole is in the center of the other solenoid. This is diagrammatically indicated in Fig. 14 A, D, G, and J, Fig. 14A showing the solenoids and the plunger in the same relative position as in Fig. 3. During the operation of the motor, the polarities established along plunger 24 by coils 118 remain the same, but the polarity of solenoids S1 and S2 is reversed in proper sequence to provide motion in either direction, in response to the position of control switch CS. As stated above, the polarity of solenoid S1 is controlled by switch MS2 and the polarity of solenoid S2 is controlled by switch MS1. The magnetic reaction between the poles of the plunger and the poles of the magnetic switch causes the pole pieces 76 of the switch to swing back and forth, as described above, as the various poles of the plunger pass through the switch. The movement of one magnetic switch is illustrated in Figs. 10 through 13, it being understood that both magnetic switches operate in the same manner. In Fig. 10, let us assume that the position of the switch CS is such that the left-hand side of the magnetic switch is connected to the positive terminal of the D. C. supply and the right-hand side of the magnetic switch is connected to the negative terminal of the D. C. supply, as indicated, and further, that the magnetic switch has a north pole at its positive side and a south pole at its negative side, as indicated. With a north plunger pole between the pole pieces 76 of the magnetic switch, the pole pieces will move to the left since the north plunger pole repels the north pole of the switch and attracts the south pole of the switch whereby the solenoid winding W is polarized south on the left end and north on the right end, as indicated. In Fig. 11, the polarity of the magnetic switch is the same since the line voltage is applied in the same direction, but a south plunger pole is now between the pole pieces 76. This causes a movement of the pole pieces in the direction opposite from that of Fig. 10 since the south plunger pole repels the south switch pole and attracts the north switch pole, resulting in a reversal of the polarity of the solenoid winding W. In Figs. 12 and 13, line voltage to the switch is reversed by reversing the position of control switch CS for reversed thrust of the plunger, however, under north and south plunger poles the switch creates the same polarity for the solenoid winding W in Figs. 12 and 13 as in Figs. 10 and 11, respectively. The reason for this action will be evident if reference is made to Fig. 14, where the capital letters N, S, on the solenoid poles refer to polarity for left plunger thrust following the plunger positions from 14A to 14L, and the lower case letters, n, s, on the solenoid poles refer to polarity for right plunger thrust following the plunger positions from 14L to 14A. It will be understood that the arrows in Fig. 14 indicate a position between the pole pieces of the respective magnetic switches and that N1, S1, N2, S2, etc. indicate plunger poles at the plunger ribs 116. Therefore, it will be noted that at positions 14A, D, G, and J, a plunger pole is in position to cause the respective magnetic switch to operate, and it will be further noted that in said operative positions, the polarity of that solenoid winding, which is about to reverse, is always the same regardless of the direction of plunger thrust so that the switching action must be the same regardless of the direction of thrust.

To operate the motor 20, the control switch CS is thrown to position L for left thrust of the plunger (it being assumed that the motor is mounted for movement of the plunger 24 relative to the power unit 22), said position of the control switch closing the line relay LR which completes the circuit between plunger coils 118 and the D. C. supply. Since the winding of each coil 118 opposes the winding of the adjacent coil, alternate north and south poles are formed along the plunger, as shown in Fig. 14, the polarity of these poles remaining the same regardless of the direction of the thrust of the plunger. The coils of the magnetic switches, MS1 and MS2, are energized through the normally closed contacts 158—162, and 156—160 of the reversing relay RR which are connected to the D. C. supply through the now closed contacts of line relay LR. The solenoid windings W1 and W2, are energized through the contacts on the magnetic switches, the latter being connected to the switch coils. The wiring diagram in Fig. 9 shows the plunger in the same position as in Fig. 14A, wherein switch MS1 is left in the position shown by the passing of north plunger pole N1, and switch MS2 has just been thrown in the position indicated in 14A by the north plunger pole N3, thereby reversing the polarity of solenoid S1 from that illustrated in Fig. 14A to that illustrated in Fig. 14B. In position 14B, the south and north poles of solenoid S1 repel poles S1 and N2 of the plunger and the north and south poles of solenoid S2 attract plunger poles S2 and N3, moving the plunger to the left. The left thrust continues in Figs. 14C and 14D until plunger poles S2 and N3 are in line with the north and south poles, respectively, of solenoid S2, at which point plunger pole S1 enters magnetic switch MS1, throwing it in the position opposite from that shown in Fig. 9, thereby reversing the polarity of solenoid S2 which begins to repel plunger poles S2 and N3, as shown in Fig. 14E. In the latter figure, the south and north poles of solenoid S1 repel plunger poles S1 and N2, respectively, the north pole of solenoid S1, also attracting plunger pole S2, the south and north poles of solenoid S2, repelling plunger poles S2 and N3, respectively. This action, which continues the left thrust of the plunger, continues through Fig. 14G where plunger poles N2 and S2 are in line with the south and north poles, respectively, of solenoid S1, at which point plunger pole S3 is in position in switch MS2, whereupon said switch is thrown in the position opposite from that shown in Fig. 9, thereby reversing the polarity of solenoid S1 which begins to repel plunger poles N2 and S2, as shown in Fig. 14H. In the latter figure, the north and south poles of solenoid S1 repel plunger poles N2 and S2, respectively, and the south and north poles of solenoid S2 attract plunger poles N3 and S3, respectively. The resulting left thrust of the plunger continues, as in 14I and 14J, and in the latter position, plunger pole N2 enters switch MS1, throwing the switch back to its position shown in Fig. 9, whereby the polarity of solenoid S2 is reversed and said solenoid begins to repel plunger poles N3 and S3, as in 14K. The left thrust of the plunger continues through 14L where the cycle repeats itself.

If the control switch CS is thrown to position R for right plunger thrust, the reversing relay RR is energized and its movable contacts 156 and 158 move to the companion stationary contacts 164 and 160, respectively, thereby reversing the polarity of both the solenoids and the magnetic switches, from that described in connection with position L of the control switch. However, it will be noted that the plunger polarity remains the same since coils 118 are connected to the same terminals of the D. C. supply since, upon the energization of relay RR, contact 150 moves to contact 152, thereby energizing relay LR which connects the coils 118 to the line supply, and a right-hand plunger thrust begins. The right thrust movement of the plunger may be followed, step-by-step as for the left thrust, by referring to Fig. 14 in reverse, i. e. from 14L to 14A, and using the lower case letters, n and s to designate the north and south poles of the solenoids.

Although six separate solenoid coils 118 have been illustrated in the drawings, it will be understood that if a lesser plunger thrust is desired, fewer coils 118 are used, and, conversely, if a greater plunger thrust is required, additional coils 118 are used.

From the foregoing description, it is apparent that in comparison with prior straight-line motors, the increased pull on the plunger, resulting from the use of coil windings on both the stationary and movable parts of the motor results in a true motor operation rather than a solenoid operation and that said windings, interacting on each other, provide a smooth, uninterrupted plunger motion without depending on the momentum or inertia of a moving plunger. The motor of the instant invention also requires fewer solenoids than prior straight-line motors, as only two solenoids are required. This results from the fact that the solenoids are always connected to the energy supply and the motion of the plunger is accomplished by the reversal of the polarity of the solenoid windings, the polarity of the plunger windings remaining unchanged. The simplified construction of the instant motor results in reduced weight and in simplified wiring of the unit, since only two wires are needed to connect the plunger to the relays and only two wires connect the solenoids and magnetic switches to the stationary contacts of relay RR.

While I have shown and described the presently preferred embodiment of my invention, it will be understood that various changes may be made in the present invention without departing from the underlying idea or principles of the invention within the scope of the appended claims.

Having thus described my invention, what I claim and desire to secure by Letters Patent is:

1. A motive device comprising means defining companion magnetic fields, means defining a series of contiguous alternate magnetic fields of fixed polarity, said companion and alternate fields being disposed for interaction of the respective fields and for mutual relative motion, and means in circuit with said first mentioned means for changing the relative polarity of said fields in predetermined sequence whereby relative movement between both of said defining means is effected, said last mentioned means being operatively responsive to said relative movement.

2. A motive device comprising polarized solenoids, a polarized plunger common to said solenoids, said solenoids and plunger being mounted for relative movement, and switch means in circuit with said solenoids and operatively responsive to said relative movement for reversing the polarity of said solenoids in predetermined sequence whereby relative rectilinear movement in a predetermined direction is produced.

3. A motive device comprising axially disposed polarized solenoids, a polarized plunger therefor, said solenoids and said plunger being mounted for relative axial movement, and magnetic means in circuit with said solenoids and operatively responsive to said movement for reversing the polarity of said solenoids in predetermined sequence whereby relative rectilinear movement in a predetermined direction is produced.

4. A motive device comprising a plurality of solenoids having their windings disposed in co-axial relation, a plunger carrying a plurality of co-axial windings arranged in tandem thereon, means mounting said plunger for axial movement relative to said solenoids in response to the interaction of the respective fields thereof, and switching means in circuit with said solenoids and operable in response to said relative movement for reversing the polarity of said solenoids whereby relative rectilinear movement in a predetermined direction is produced.

5. A motive device comprising a plurality of solenoids having their windings disposed in co-axial relation, a plunger carrying a plurality of co-axial windings arranged in tandem thereon, means mounting said plunger for axial movement relative to said solenoids in response to the interaction of the respective fields thereof, switching means in circuit with said solenoids and operable in response to said relative movement for reversing the polarity of said solenoids, and switching means for reversing the direction of said relative movement whereby relative rectilinear movement in a predetermined direction is produced.

6. A motive device comprising solenoid means, a plurality of contiguous connected windings, each of said windings being wound in opposition to the winding adjacent thereto and being of fixed polarity, said windings being mounted coaxially of said solenoid means for the interaction of their respective fields, and magnetic switch means in circuit with said solenoids for periodically changing the polarity of said solenoid means in response to predetermined positions of said windings whereby relative movement between said solenoid means and said windings is effected.

7. A motive device comprising solenoid means, a plurality of contiguous connected windings, each of said windings being wound in opposition to the winding adjacent thereto and being of fixed polarity, said windings being mounted coaxially of said solenoid means for the interaction of their respective fields, and magnetic means in circuit with said solenoids for periodically changing the polarity of said solenoid means in response to predetermined positions of said windings relative thereto whereby relative movement between said solenoid means and said windings in a predetermined lineal direction is effected, said last mentioned means comprising magnetic means for reversing the energization of said solenoid means, said magnetic means being connected in shunt with said solenoid means and in shunt with said windings.

8. A motive device comprising a pair of solenoid means adapted to be connected to a source of energy for magnetically polarizing each of said means, a series of windings adapted to be connected to said source and disposed coaxially of said solenoid means to interact with the latter, each of said windings being connected and wound in opposition to the adjacent winding, means carried by said solenoid means and mounting said windings for relative movement, and an additional means for each of said solenoid means for changing the polarity of each of said solenoid means in response to predetermined positions of said windings relative to said additional means whereby relative movement between said solenoid means and said windings is effected.

9. An electromagnetic straight-line motor comprising a pair of axially disposed solenoids adapted to be connected to a direct-current supply, a plunger disposed coaxially of said solenoids, said solenoids and plunger being mounted for relative rectilinear movement in a predetermined direction, said plunger being provided with a series of windings adapted to be connected to said supply, each of said windings being connected and wound in opposition to the adjacent winding, and magnetic switch means in circuit with said solenoids for reversing the direction of current flow through said solenoids in predetermined sequence to effect said relative movement, said switch means having a polarized operating member interacting with said plunger at predetermined positions of the latter.

10. An electromagnetic straight-line motor comprising a pair of axially disposed solenoids adapted disposed solenoids adapted to be connected to a direct-current supply, a plunger common thereto, said solenoids and plunger being mounted for relative axial movement, said plunger being provided with a series of windings adapted to be connected to said supply, each of said windings being connected and wound in opposition to the adjacent winding, and a separate magnetic switch means for each of said solenoids for reversing the direction of current flow through its companion solenoid in predetermined sequence to effect relative movement of said plunger and said solenoids, each of said switch means having a polarized operating member interacting with said plunger at predetermined positions of the latter.

11. An electromagnetic straight-line motor comprising a pair of axially disposed solenoids, a plunger disposed coaxially thereof, said solenoids and plunger being mounted for relative axial movement, said plunger being provided with a series of windings, each of said windings being connected and wound in opposition to the adjacent winding, and a separate magnetic switch means in shunt circuit with each of said solenoids and in shunt with said plunger for reversing the direction of current flow through its companion solenoid in predetermined sequence to effect relative movement of said plunger and said solenoids in a predetermined direction, each of said switch means having a polarized operating member interacting with said plunger at predetermined positions of the latter, and means for reversing the direction of said relative movement.

12. An electromagnetic straight-line motor comprising a pair of axially disposed solenoids adapted to be connected to a direct-current supply, a solenoid plunger extending coaxially therethrough, said solenoids and plunger being mounted for relative movement, said plunger being provided with a series of windings adapted to be connected to said supply, each of said windings being connected and wound in opposition to the adjacent winding, and a separate magnetic switch means for each of said solenoids for reversing the direction of current flow through its companion solenoid in predetermined sequence to effect relative movement of said plunger and said solenoids in a predetermined direction, each of said switch means having a polarized operating member interacting with said plunger at predetermined positions of the latter, and means for reversing the direction of said relative movement comprising a reversing relay for reversing the connections of said solenoids to the direct-current supply.

13. An electromagnetic straight-line motor comprising a pair of axially disposed solenoids adapted to be connected to a direct-current supply, a solenoid plunger extending coaxially therethrough, said solenoids and plunger being mounted for relative movement, said plunger being provided with a series of windings adapted to be connected to said supply, each of said windings being connected and wound in opposition to the adjacent winding, and a separate magnetic switch means in shunt with each of said solenoids for reversing the direction of current flow through its companion solenoid in predetermined sequence to effect relative movement of said plunger and said solenoids in a predetermined direction, each of said switch means being in shunt with said plunger and operatively responsive to predetermined positions of said plunger, and means for reversing the direction of said relative movement comprising a reversing relay for reversing the connections of said solenoids to the direct-current supply and control means for operating said relay.

14. In apparatus of the character described, axially aligned solenoid coils each mounted on a tubular member, and a common plunger extending coaxially through said members, said solenoid coils and plunger being mounted for relative axial movement in a predetermined direction, said plunger comprising a series of coils, each being connected and wound in opposition to the adjacent coil for interaction with said solenoid coils to effect said movement in a predetermined direction, and means in circuit with said solenoid coils and operatively responsive to said relative movement for reversing the polarity of said solenoid coils in predetermined sequence.

15. In apparatus of the character described, a pair of axially aligned solenoids, each being provided with a pole face at each of the ends thereof, said solenoids being so spaced that the distance between the centers of the pole faces of each of said solenoids is substantially equal to the distance from the center of either of said solenoids to the center of the adjacent pole face of the companion solenoid, and a common plunger for said solenoids, said solenoids and plunger being mounted for relative rectilinear movement in a predetermined direction, said plunger comprising a series of coils each having a dimension equal to the distance between the centers of the pole faces of each of said solenoids.

16. In apparatus of the character described, a pair of axially aligned solenoids, each being provided with a pole face at each of the ends thereof, said solenoids being so spaced that the distance between the centers of the pole faces of each of said solenoids is substantially equal to the distance from the center of either of said solenoids to the center of the adjacent pole face of the companion solenoid, and a common plunger for said solenoids, said solenoids and plunger being mounted for relative rectilinear movement in a predetermined direction, said plunger comprising a series of coils, each being connected and wound in opposition to the adjacent coil, and each having a dimension substantially equal to the distance between the centers of the pole faces of each of said solenoids.

17. In apparatus of the character described, a pair of axially aligned solenoids, each being provided with a pole face at each of the ends thereof, said solenoids being so spaced that the distance between the centers of the pole faces of each of said solenoids is substantially equal to the distance from the center of either of said solenoids to the center of the adjacent pole face of the companion solenoid, and a common plunger for said solenoids, said solenoids and plunger being mounted for relative rectilinear movement in a predetermined direction, said plunger comprising a core provided with rib members spaced longitudinally thereof, the distance between the centers of each pair of adjacent ribs being substantially equal to the distance between the centers of the pole faces of each of said solenoids.

18. In apparatus of the character described, a pair of axially aligned solenoids, each being provided with a pole face at each of the ends thereof, said solenoids being so spaced that the distance between the centers of the pole faces of each of said solenoids is substantially equal to the distance from the center of either of said solenoids to the center of the adjacent pole face of the companion solenoid, and a common plunger for said solenoids, said solenoids and plunger being mounted for relative rectilinear movement in a predetermined direction, said plunger comprising a core provided with rib members spaced longitudinally thereof, the distance between the centers of each pair of adjacent ribs being substantially equal to the distance between the centers of the pole faces of each of said solenoids, and a winding carried between each pair of ribs by said core, said windings being connected in series.

19. In apparatus of the character described, a pair of axially aligned solenoids, each being provided with a pole face at each of the ends thereof, said solenoids being so spaced that the distance between the centers of the pole faces of each of said solenoids is substantially equal to the distance from the center of either of said solenoids to the center of the adjacent pole face of the companion solenoid, and a common plunger for said solenoids, said solenoids and plunger being mounted for relative rectilinear movement in a predetermined direction, said plunger comprising a core provided with rib members spaced longitudinally thereof, the distance between the centers of each pair of adjacent ribs being substantially equal to the distance between the centers of the pole faces of each of said solenoids, and a winding carried between each pair of ribs by said core, said windings being connected in series, and each winding being wound in opposition to the adjacent winding.

20. In apparatus of the character described, a pair of axially aligned solenoids, a plunger of fixed polarity common thereto, said solenoids and plunger being mounted for relative rectilinear movement in a predetermined direction, and a separate device for reversing predeterminedly the polarity of each one of said solenoids, each of said devices being disposed axially of said solenoids and adjacent the outer end of the solenoid controlled by the companion device.

21. In apparatus of the character described, a pair of axially aligned solenoids, a pair of magnetic switch devices for reversing sequentially the polarity of said solenoids, each switch being in circuit with one of said solenoids, and a plunger for said solenoids for operating said switches, said solenoids, said switch devices and said plunger being mounted for relative movement, said switch devices being movable in a plane perpendicular to the plane of movement of said solenoids and plunger.

22. In apparatus of the character described, a power unit comprising a pair of spaced axially aligned solenoids, and a pair of magnetic switches in axial alignment with said solenoids, each switch being in circuit with one of said solenoids for controlling the polarity thereof, said magnetic switches being adapted for movement relative to said solenoids.

23. In apparatus of the character described, a power unit comprising a pair of axially aligned solenoids, each being provided with a pole face at each of the ends thereof, said solenoids being so axially spaced that the distance between the centers of the pole faces of each of said solenoids is substantially equal to the distance from the center of either of said solenoids to the center of the adjacent pole face of the other solenoid, and a pair of magnetic switches axially aligned with said solenoids, one of said switches being disposed at each outermost end of said pair of solenoids for controlling the polarity thereof.

24. A straight-line motor comprising axially disposed solenoids, a polarized plunger axially mounted relative to said solenoids, said solenoids and plunger being mounted for relative rectilinear movement in a predetermined direction, and switch means for reversing the direction of energy flow through said solenoids in predetermined sequence to effect relative movement of said plunger and said solenoids, said switch means comprising a pivotally mounted solenoid provided with opposing pole pieces extending from the ends thereof, said plunger being movable between said pole pieces and said latter solenoid moving in response to the interaction of the respective magnetic fields of said plunger and said pole pieces.

25. A motive device comprising a plurality of solenoids having their windings disposed in coaxial relation, a plunger arranged axially of said solenoids and carrying a plurality of coaxial windings arranged in tandem thereon, said solenoids and plunger being mounted for relative axial movement in a predetermined direction, and switching means in circuit with said solenoids and operable in response to said relative movement for alternately reversing the direction of energy flow through said solenoids, said switching means comprising a solenoid provided with opposing pole pieces carrying movable contact parts, companion stationary contact parts connected to said plurality of solenoids, said plunger being movable between said pole pieces, and the solenoid of said switching means moving in response to the interaction of said plunger and said pole pieces whereby said movable parts make and break contact with said companion parts to alternately reverse the direction of energy flow through said plurality of solenoids.

FREDERICK C. FISHER.

References Cited in the file of this patent
UNITED STATES PATENTS

| Number | Name | Date |
| --- | --- | --- |
| 469,441 | Wightman | Feb. 23, 1892 |
| 573,821 | Leffler | Dec. 22, 1896 |
| 1,647,147 | Roller | Nov. 1, 1927 |
| 1,933,911 | Jacobson | Nov. 7, 1933 |
| 1,970,412 | Bates | Aug. 14, 1934 |
| 1,986,639 | Konn | Jan. 1, 1935 |
| 2,004,114 | Hubbell | June 11, 1935 |
| 2,041,607 | Hopkins | May 19, 1936 |
| 2,298,573 | Little | Oct. 13, 1942 |
| 2,303,263 | Fisher | Nov. 24, 1942 |
| 2,328,337 | Hanchock | Aug. 31, 1943 |
| 2,365,632 | Fisher | Dec. 19, 1944 |
| 2,458,770 | Dickey et al. | Jan. 11, 1949 |
| 2,462,533 | Moynihan | Feb. 22, 1949 |